(12) United States Patent
Bailey et al.

(10) Patent No.: US 6,837,084 B2
(45) Date of Patent: Jan. 4, 2005

(54) INTERLOCK MECHANISMS

(75) Inventors: Simon Bailey, Walsall (GB); Timothy Christopher Stubbs, Birmingham (GB); Justin Titus Tun, West Midlands (GB)

(73) Assignee: Fortress Interlocks Limited, West Midlands (GB)

( * ) Notice: Subject to any disclaimer, the term of this patent is extended or adjusted under 35 U.S.C. 154(b) by 0 days.

(21) Appl. No.: 10/203,263

(22) PCT Filed: Feb. 6, 2001

(86) PCT No.: PCT/GB01/00461

§ 371 (c)(1),
(2), (4) Date: Nov. 27, 2002

(87) PCT Pub. No.: WO01/57344

PCT Pub. Date: Aug. 9, 2001

(65) Prior Publication Data

US 2003/0140669 A1 Jul. 31, 2003

(30) Foreign Application Priority Data

Feb. 7, 2000 (GB) .............................................. 0002644

(51) Int. Cl.[7] ................................................ E05B 11/00
(52) U.S. Cl. ...................... 70/389; 70/337; 70/379 R; 403/381; 52/582.1
(58) Field of Search ......................... 70/389, DIG. 63, 70/337–339; 52/582.1, 582.2; 160/40; 403/381

(56) References Cited

U.S. PATENT DOCUMENTS

| 297,491 | A | * | 4/1884 | Booth | 52/582.1 |
|---|---|---|---|---|---|
| 443,886 | A | * | 12/1890 | Well | 70/441 |
| 1,092,259 | A | * | 4/1914 | Harn | 70/197 |
| 2,220,786 | A | * | 11/1940 | Grainger | 70/262 |
| 2,780,088 | A | * | 2/1957 | Nabeit | 70/389 |
| 4,228,669 | A | * | 10/1980 | Bischoff | 70/379 R |
| 4,315,420 | A | * | 2/1982 | Oliver | 70/379 R |
| 4,417,430 | A | * | 11/1983 | Loikitz | 52/582.2 |
| 4,567,741 | A | * | 2/1986 | Trempala | 70/389 |
| 4,641,509 | A | * | 2/1987 | Batchelor et al. | 70/388 |
| 5,020,347 | A | * | 6/1991 | Logan | 70/389 |
| 5,022,645 | A | * | 6/1991 | Green | 271/276 |
| 5,431,509 | A | * | 7/1995 | Anderson et al. | 403/381 |
| 5,505,066 | A | * | 4/1996 | Baucom | 70/389 |
| 5,531,535 | A | * | 7/1996 | Lind | 403/297 |
| 5,716,043 | A | * | 2/1998 | Iwata et al. | 269/73 |
| 5,727,407 | A | * | 3/1998 | Cowen | 70/389 |
| 6,174,102 | B1 | * | 1/2001 | Do et al. | 403/381 |
| 6,350,080 | B1 | * | 2/2002 | Do et al. | 403/381 |
| 6,421,970 | B1 | * | 7/2002 | Martensson et al. | 52/282.1 |
| 6,435,755 | B1 | * | 8/2002 | Nagai et al. | 403/191 |
| 6,478,501 | B1 | * | 11/2002 | Kahl | 403/255 |

* cited by examiner

*Primary Examiner*—Suzanne Dino Barrett
(74) *Attorney, Agent, or Firm*—Andrus, Sceales, Starke & Sawall, LLP

(57) ABSTRACT

An interlock unit (10) for use with at least one other like unit (11) to form an interlock mechanism has a top face (13) and opposed pairs of side walls (12) with at least one runner bar (17, 18) mounted in the unit for lateral sliding movement. An actuator (14, 15, 22) is supported on the top face (13), to effect lateral sliding movement of the runner bar (17, 18). One wall of the unit is provided with one part (27) of a two-part connector with the other part (33) on the opposed wall whereby two similar units may be joined together by relative sliding movement of the two units in the plane of the side walls (12). Joining together of two units (10, 11) in this way also joins together the runner bars (17) or (18) of the two units such that sliding motion of the runner bar (17) of one unit (10) is transferred to the runner bar (17) of the connected unit (11), for at least one direction of sliding movement of the runner bars (17).

17 Claims, 9 Drawing Sheets

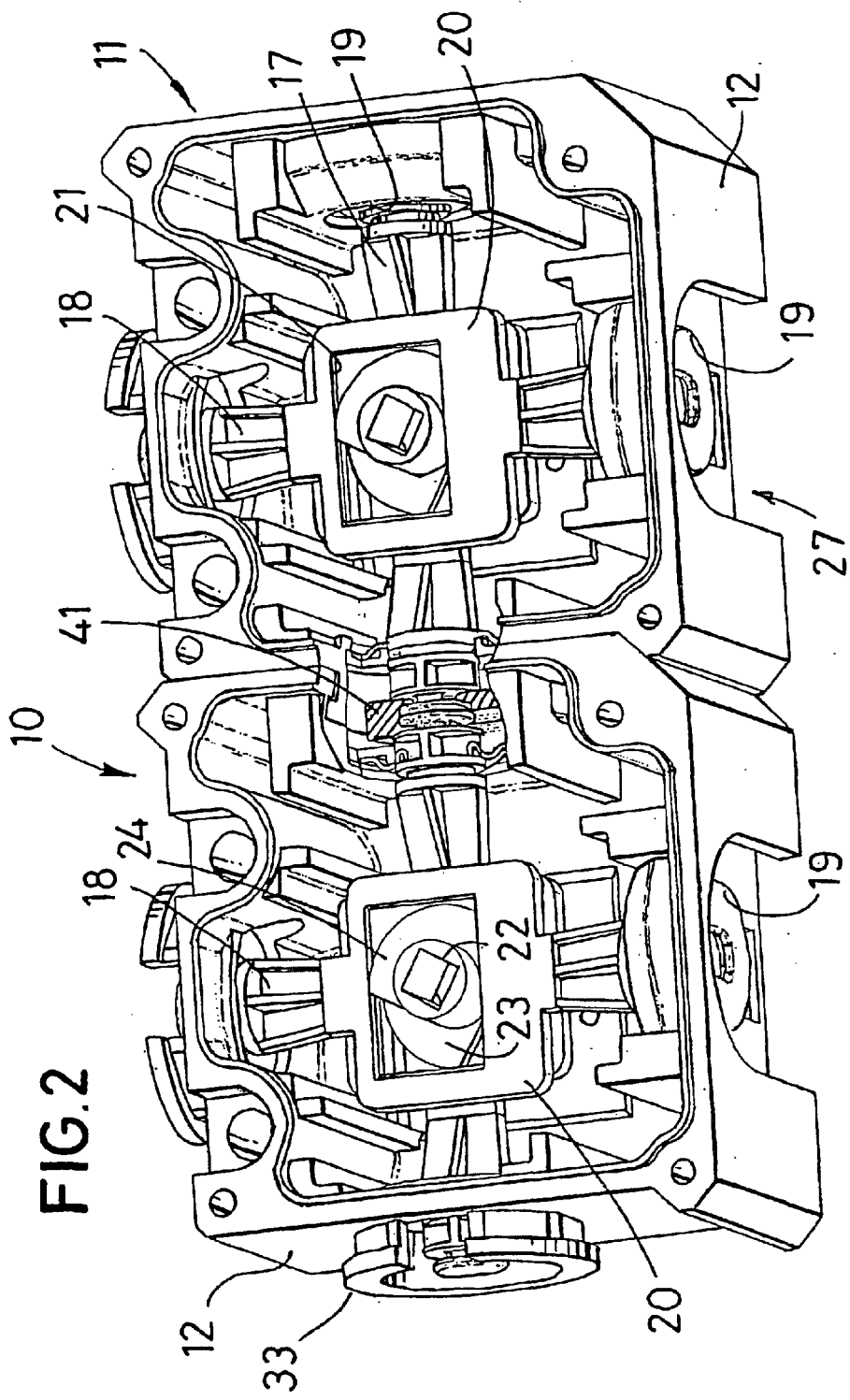

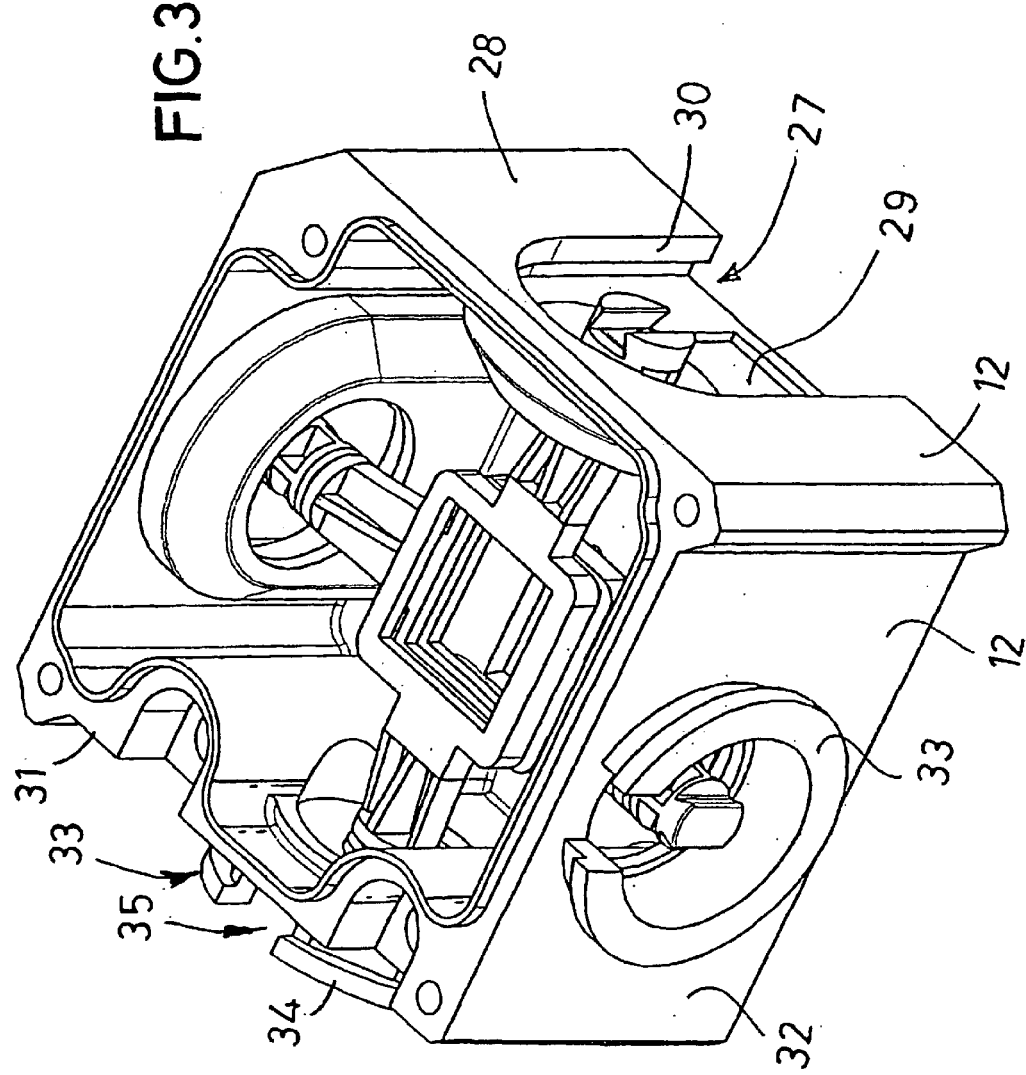

INTERLOCK MECHANISMS

CROSS-REFERENCE TO RELATED APPLICATIONS

This application is the U.S. national stage application of International Application PCT/GB01/00461, filed Feb. 6, 2001, which international application was published on Aug. 9, 2001, as International Publication WO 01/57344 in the English language. The International Application claims priority of British Patent Application No. 0002644.3, filed Feb. 7, 2000.

This invention relates to an interlock unit for use with at least one other like interlock unit, to form an interlock mechanism. The invention further relates to an interlock mechanism assembled from such interlock units.

Interlock mechanisms are widely used in various industries, to ensure equipment is operated safely and in accordance with pre-defined procedures. Most such mechanisms are key-operated, but they can include one or more other operating devices, such as a solenoid supplied with electrical power depending upon the setting of a remote switch. The switch may, in turn, be operated for example by a machine guard or some other moveable component.

A typical interlock mechanism has a plurality (and at least two) actuators, and usually at least two key-operated actuators, the mechanism being arranged so that an activity can be undertaken only when at least one key has been inserted into its respective actuator and is trapped there, to prevent its use elsewhere. For instance, there may be two such actuators arranged so that one key must always be present in its actuator. If a key is required for example to open a door to a protected area, that key may be removed only if another key used to control an activity in that protected area is inserted into the other actuator and is trapped there.

The principles of key-interlock mechanisms of the kind described above are well known in the art and form no part of the present invention, as such. Consequently, they will not be described in further detail here.

A problem of an interlock mechanism of the kind described above is that in general the mechanism must be constructed especially for each intended application. In particular, the interlinking of the key-operated actuators by internal runner bars must specifically be designed to provide the required functionality. Though standardised parts may be used in assembling the mechanism, it is usually necessary expressly to design the mechanism for the intended use and then to manufacture parts just for that one design. In turn, this leads to relatively high costs, and the inability to re-use the interlock mechanism in the event that the original use becomes redundant.

It is a principal aim of the present invention to provide means whereby an interlock mechanism may be assembled to any particular design for a proposed use, from discrete building blocks each of which has an individual actuator for example configured to accommodate a key and interact with the other blocks.

According to the present invention, there is provided an interlock unit for use with at least one other like interlock unit to form an interlock mechanism, which interlock unit has a top face and opposed pairs of side walls, at least one runner bar mounted in the unit for lateral sliding movement, an actuator for effecting lateral sliding movement of the runner bar which actuator is supported on the top face of the unit, one wall of an opposed pair thereof being provided with one part of a two-part unit connector and the opposed wall with the other part of the connector, which connector is arranged to permit two similar units to be joined together by relative sliding movement of the two units in the plane of the side walls to inter-engage the respective connector parts, the runner bar of one unit being engageable with the runner bar of a connected unit to transfer sliding motion thereto for sliding movement of the runner bar of said one unit in at least one direction.

It will be appreciated that a complete interlock mechanism may be assembled from a plurality of interlock units of this invention and given the required functionality for the intended purpose, by adjusting the internal components of each interlock unit. By having the runner bars of the respective units automatically engaging the runner bars of the adjacent units, the motion of one runner bar may be transferred to the mechanism of the other units in the assembly so as to control the freeing or the locking of other actuators of those other units.

For many applications, each actuator includes a receptor for a removable key, whereby the insertion of a suitably coded key into the receptor permits the turning of the receptor by the key, and so the operation of the actuator. It is also possible to employ one or more remotely controlled actuators, such as a solenoid or motor-driven actuator. Such an actuator may be controlled by a remote switch, operated for example by a machine guard or some other moveable component.

It is preferred that the unit connector allows the joining together of two units by relative sliding movement therebetween, in a direction normal to the top surfaces of the two units. This may be achieved by having the one part of the unit connector formed as a re-entrant slot on the one face of the unit, preferably opening into the bottom wall of the unit. Then, the other part of the connector may define a projection of a complementary form to the re-entrant slot so that the slot of one unit and the projection of a second unit are interengageable by relative sliding movement of the units, along the length of the slot.

The projection may be of circular form, so that the unit having the projection may take up a required angular orientation with respect to the unit having the slot. In the alternative, a peg and slot arrangement may be formed on the two units being joined together so that when fully connected, the units have a relationship pre-defined by the peg and slot.

To permit automatic interengagement between the runner bars of adjacent units on joining the units together, each runner bar should be arranged for sliding movement in a direction normal to the opposed pair of side walls of a unit carrying the connector parts. A preferred arrangement has two runner bars arranged mutually at right angles and for sliding movement with respect to each opposed pair of side walls. In such a case, each opposed pair of side walls should carry respective connector parts, so that a second interlock unit may be joined to any one of the four side walls of a first unit, the respective runner bars then automatically interengaging.

Further to facilitate the automatic interengagement of the runner bars of adjacent units, it is convenient for there to be respective apertures formed through the connector parts of the opposed pairs of side walls, with the runner bars arranged for sliding movement in those apertures. To this end, the two runner bars of one unit may be oppositely cranked to permit them to cross over each other in the central region of the unit, whilst having the axes of all four apertures lying in the same plane.

In the simplest case, motion may be transferred from a runner bar of one unit to the runner bar of an adjacent unit by having the adjacent ends of the respective runner bars simply abutting each other; thus, either runner bar may push but not pull the other. Preferably, however, the runner bars interengage to permit either bar to push or pull the adjacent bar and to this end a coupling piece may be provided on one end of the runner bar of one unit and which is engageable with the opposed end of the runner bar of a connected unit. To this end, both end portions of each runner bar may be provided with a connector block profiled to permit the interconnection thereto of the coupling piece and to hold the coupling piece against relative axial movement.

Each unit preferably is provided with a cam arranged to effect movement of the (or each) runner bar of the unit upon rotation of the cam. Such a cam may form a part of the actuator, so as to be turned for example by the key receptor, on using the appropriate key. The insertion of a key into the receptor and then turning of the key to rotate the receptor traps the key therein and also turns the cam to move the runner bar. This action may free for rotation the cam, and so also the receptor, of an adjacent unit so that the key of that unit may be turned and released from the adjacent unit.

This invention extends to a key-interlock mechanism whenever assembled from two or more interlock units of this invention as described above.

By way of example only, one specific embodiment of a key-interlock mechanism of this invention and assembled from two interlock units will now be described in detail, reference being made to the accompanying drawings, in which:

FIG. 2 is an isometric internal view of the two units, with the cover plates removed for clarity;

FIG. 3 is an isometric view on an enlarged scale of one of the units, with various parts removed for clarity;

Figure 1:
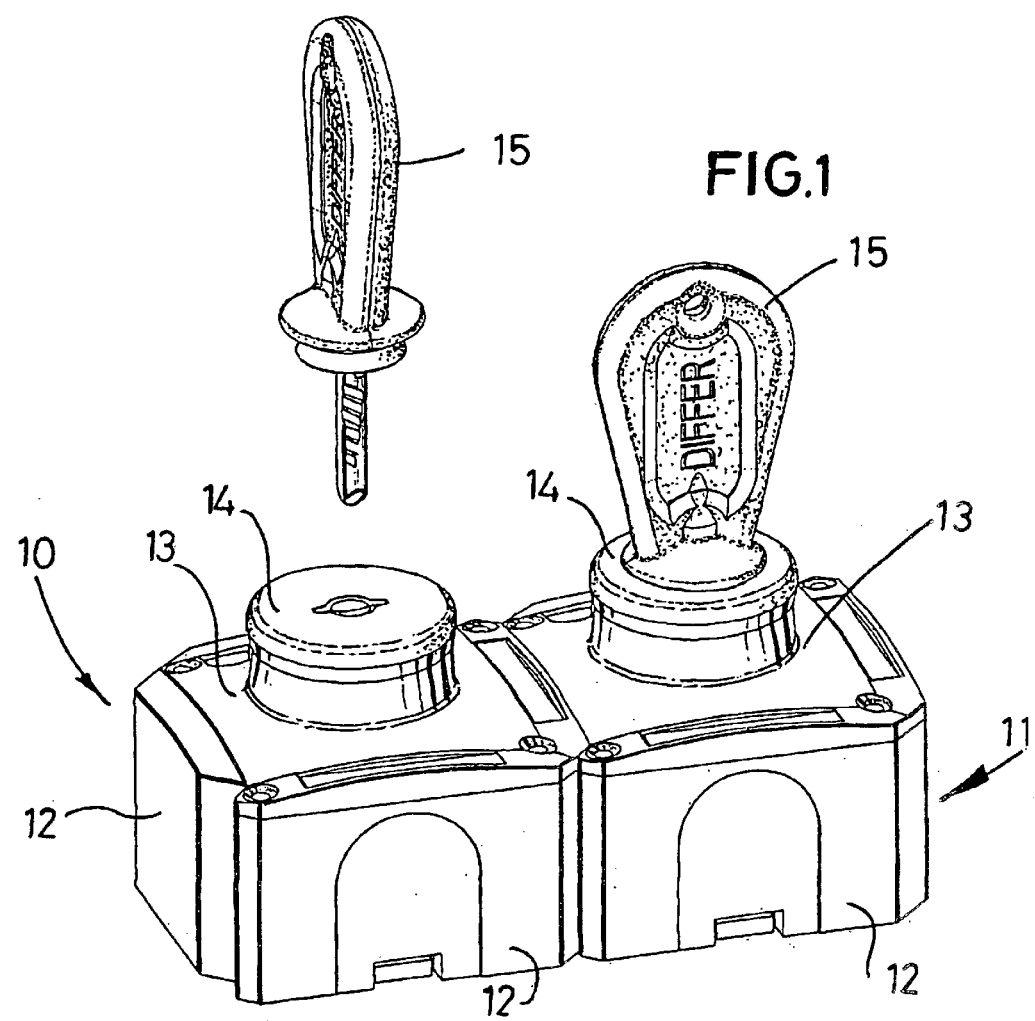
FIG. 1 is an isometric view of the mechanism comprising two key-interlock units interlinked and with one key inserted.

Referring initially to FIG. 1, there is shown an interlock mechanism arranged in accordance with this invention and assembled from two similar interlock units 10 and 11 each having a key-operated actuator. Each unit is generally of square cross-sectional shape and has opposed pairs of side walls 12 and a cover plate 13. Each cover plate includes a central rotatable key receptor 14 pre-configured to accept a key 15 of a particular design and coding. Thus, the two key receptors 14 of the two units 10 and 11 should differ internally, so that each may accept only a particular key 15. Each key receptor is arranged so that it may accept a key when in a particular rotational setting, and when turned from that setting by an inserted key, the key may no longer be removed.

The two key receptors are interlinked within the interlock units to control the rotation thereof and so the possibility of the insertion and removal of keys. In the arrangement shown in FIG. 1, the right hand key cannot be removed from its receptor, nor can the receptor be turned by the key to the key-removal position. The left hand key may be inserted into its receptor and turned to lock the key in its receptor; and when turned, the right hand key may be turned and removed.

A key-interlock mechanism as described above is well known in the art and is widely used in many areas of industry. Since the function and use of such a key-interlock mechanism forms no part of the present invention, it will not be described in further detail here.

FIGS. 2 and 3 shown internal constructional details of the interlock units 10,11 as well as the connector by means of which the two units 10,11 are joined together. In each unit, there are two runner bars 17,18 arranged for sliding movement across the unit, respectively between opposed pairs of side walls 12. Thus, the line of sliding action of one runner bar 17 is at 90° to that of runner bar 18. The side walls have respective apertures 19 slideably to support the runner bars, the free ends of which may thus project through the apertures 19 in the side walls. The axes of all four apertures 19 lie in the same plane, the runner bars being cranked in opposite senses in order to allow the central regions 20 thereof to overlie one another and slide with respect to the other. Each central region is generally in the form of a rectangular plate, with a rectangular opening 21 formed therethrough. The runner bars 17,18 may be identical, but are mounted with opposed faces uppermost.

In each unit, a cam 22 is centrally mounted within the openings 21, for rotation about a vertical axis. The cam has a pair of lobes 23,24 respectively engageable with the central regions 20 of the two runner bars 17,18 of that unit. The cam profile of each lobe is arranged so that rotation of the cam may cause sliding movement of the associated runner bar along its length, in one direction or the other, depending upon the initial setting and angular movement of the cam. Moreover, the runner bars may also block rotational movement of the cam, again depending upon the relative disposition of the cam and the two bars.

The cam 22 has a central hole 25 of square cross-sectional shape, engageable by a square drive-shank (not shown) on the underside of the key receptor 14 of the cover plate 13 for the unit. Thus, rotation of a key inserted into the receptor causes the cam 22 of that unit to rotate and so to move the runner bars 17,18 of that unit.

The opposed pairs of side walls 12 of each unit are provided with the complementary parts of a connector adapted to permit two similar units to be joined together, as shown in FIGS. 1 and 2. There is formed a slot 27 in one side wall 28 (FIG. 3) which slot opens into the bottom plane 29 of the unit and is closed at its upper end, adjacent the top of the unit, the upper end having a semi-circular profile as best seen in FIG. 3. The slot 27 has a re-entrant form, defined by an inwardly-directed lip 30, formed around the edge of the slot 27.

The side wall 31 opposed to side wall 28 (and so also side wall 32, between side walls 28 and 31) is formed with a circular projection 33, the projection having a flange 34 formed around its periphery. The projection 33 is discontinuous in its upper region, so as to provide a channel 35 leading to the central region of the projection, for a purpose to be described below. The projection 33 and flange 34 are configured so as to permit interengagement with a slot 27 of a second unit, such that the two units will be joined together with their respective side walls 28,31, in frictional engagement with one another and held against axial separation. Though not shown, a peg may be provided within the slot 27 to locate in channel 35 so as to hold the two units against relative rotational movement. In the alternative, no such peg need be provided and the two units may be positioned at different relative angular dispositions, for unusual applications.

Figure 4A:
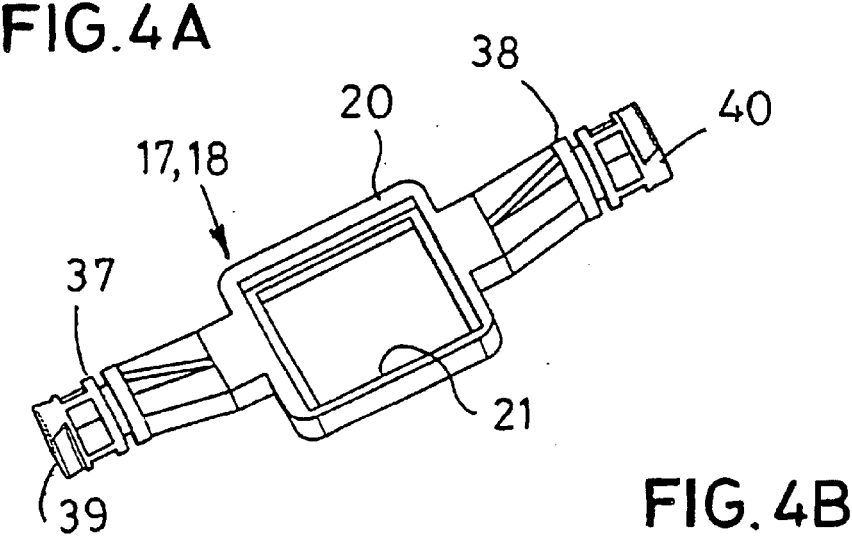
FIGS. 4A and 4B are respectively isometric and side views of a runner bar used in a unit.
Figure 4B:
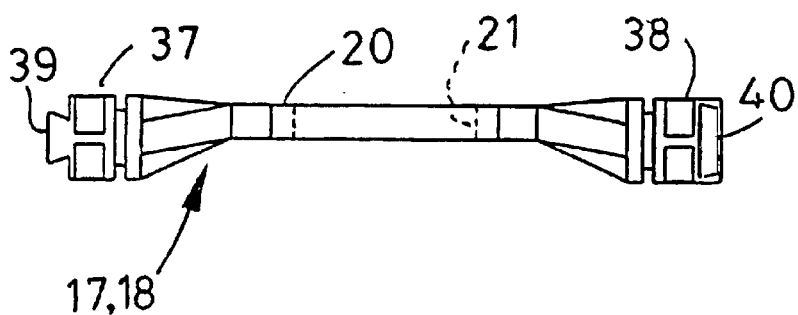
Figure 5A:
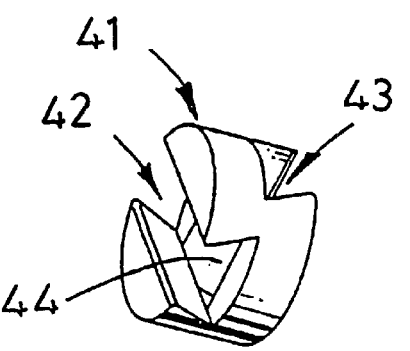
FIGS. 5A and 5B are two different isometric views of a coupling piece for interlinking two runner bars.
Figure 5B:
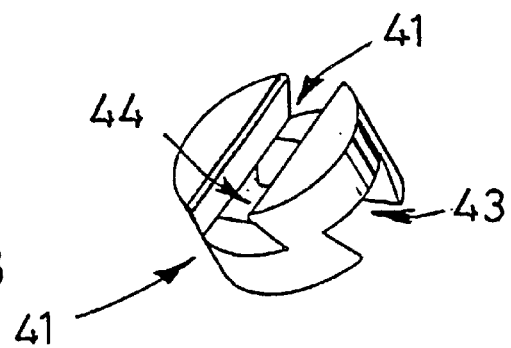

Referring particularly to FIGS. 4A and 4B, the two end portions 37,38 of each runner bar 17,18 are formed with a transversely extending connector block 39,40, the orientation of that block at one end portion 37 being at 90° to the orientation of the other block 40 on the other end portion 38. Each connector block is of dove-tail cross-section to permit the connection thereto of a coupling piece 41, as shown in FIGS. 5A and 5B. This coupling piece has a pair of dove-tail grooves 42,43 extending thereacross at right angles to one another, there being a central aperture 44 through the coupling piece to permit the direct interengagement of the end planes of the connector blocks 39,40 of two adjacent runner bars connected by the coupling piece 41.

The coupling piece 41 is used by sliding the coupling piece on to connector block 40 on end portion 38 of a runner bar—that is to say, the connector block the length of which runs generally parallel to the bottom plane 29 of the associated interlock unit. The coupling piece 41 will thus not fall off the connector block under gravity and groove 43 will extend generally vertically, as shown at the right hand side in FIG. 3. Then, on joining a second interlock unit to the first interlock unit, by interengaging projection 33 on that second interlock unit into the slot 27 of the first unit, the coupling piece 41 will move through channel 35 in the projection 33, to engage the connector block 39, provided of course that the associated cams have properly been turned to an initial set-up position. Once fully interengaged, the two runner bars are interlinked so that they may slide simultaneously, in unison.

Figure 6:
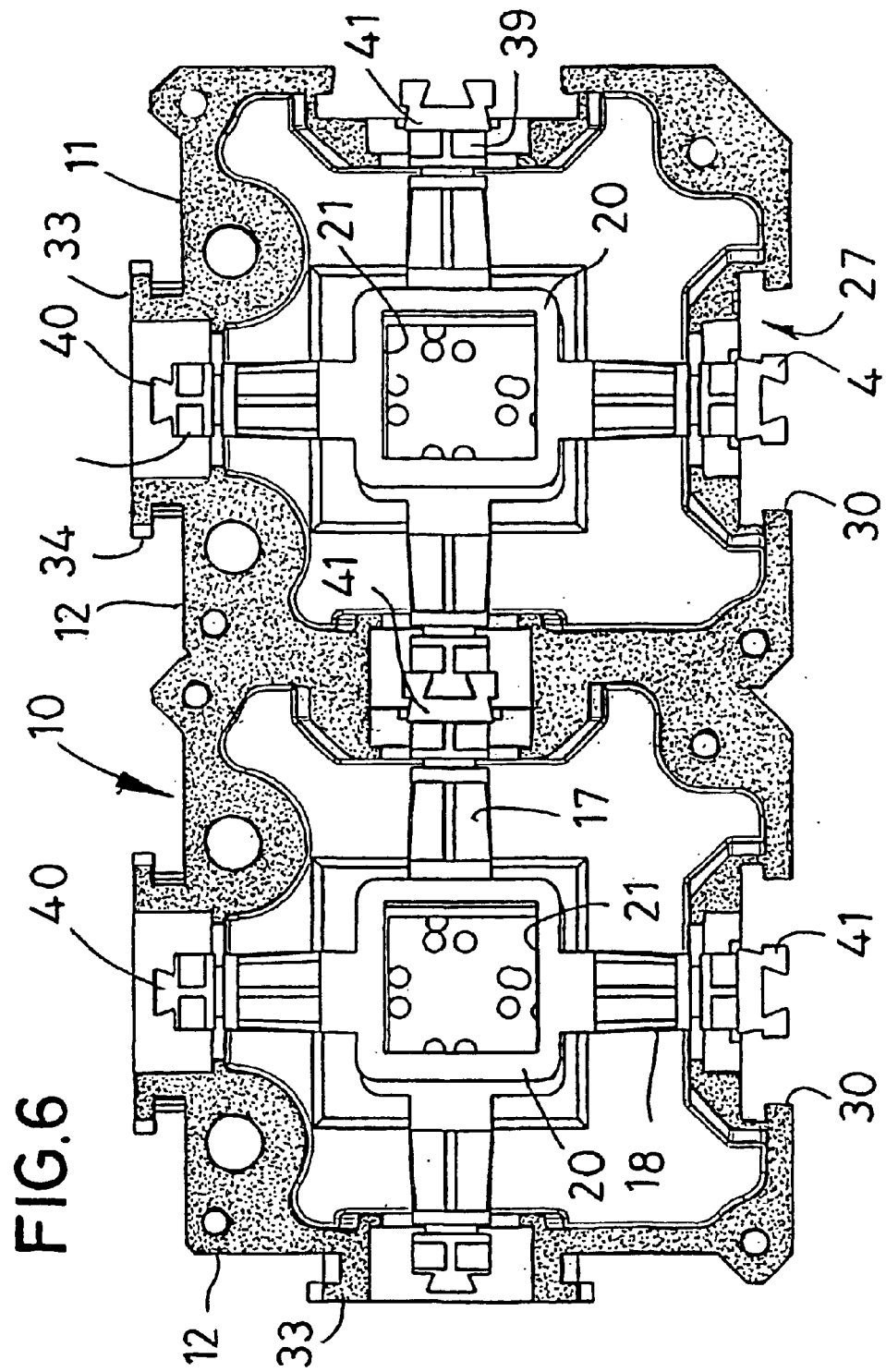
FIGS. 6 and 7 are plan views on the two units with a runner bar of one unit connected to the runner bar of the other unit, and with the runner bars in two different settings, respectively.
Figure 7:
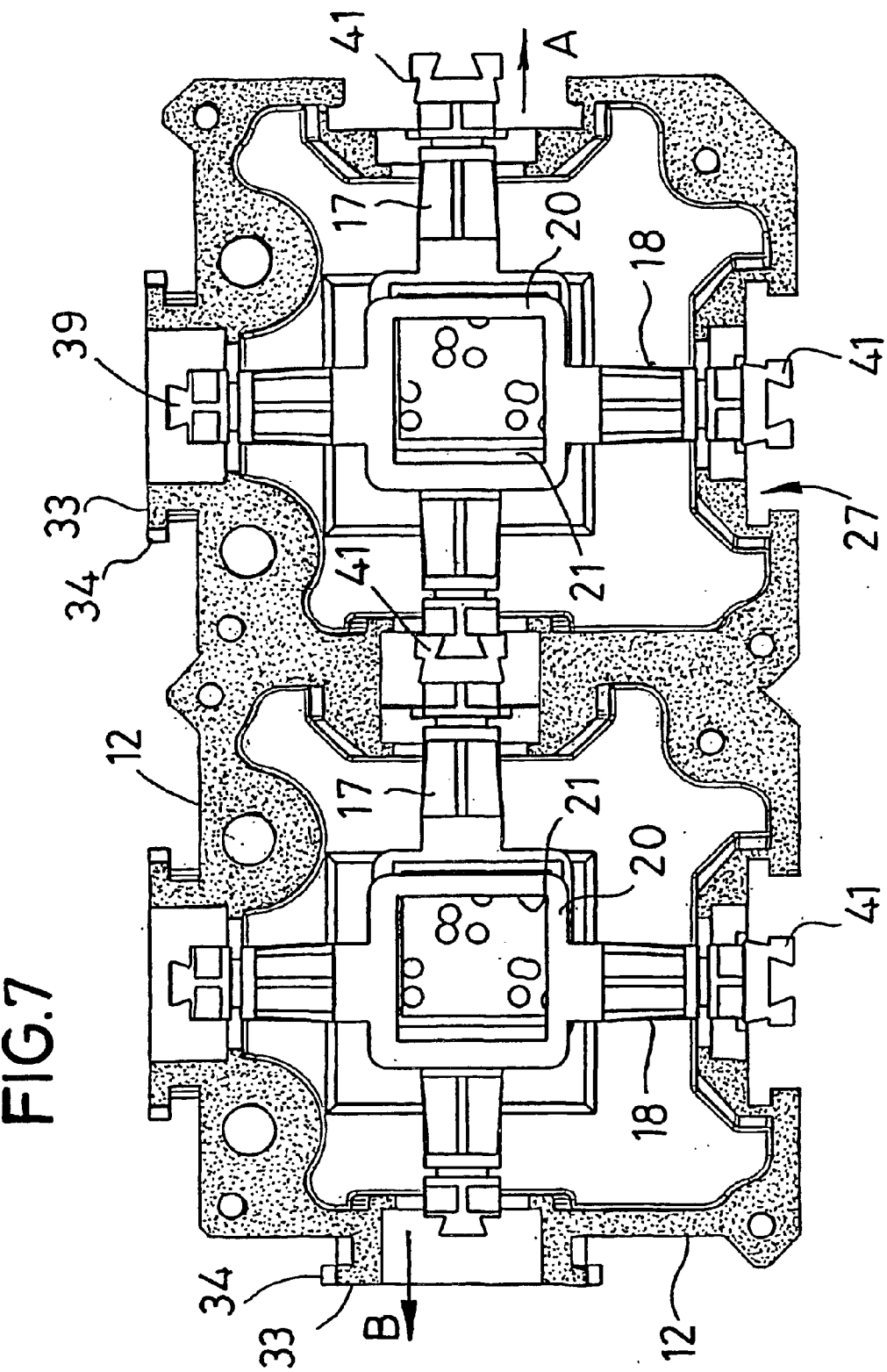

Referring now to FIGS. 6 and 7, there are shown two interlock units 10 and 11 joined together, with their respective runner bars 17 interlinked by coupling piece 41. The runner bars 17,18 are all in their initial setting, ready for the connection thereto of further interlock units, should that be required. Such further interlock units may extend the linear array shown in FIGS. 6 and 7, or may be added to the other side walls of the units, so as to make up a complex two-dimensional array.

As shown in FIG. 7, if the right hand runner bar 17 is moved to the right in the direction of arrow A by cam 22 (not shown in FIGS. 6 and 7) upon rotation of the key receptor by an inserted key, that motion of the runner bar 17 will pull with it the corresponding runner bar 17 of the left hand unit. Conversely, rotation of the key receptor of the left hand unit, by an inserted key, so as to move the runner bar 17 of the left hand unit to the left, in the direction of arrow B, will pull with it the right hand runner bar 17. Similar actions will be performed by the other interlinked runner bars of further added units, to the assembly.

Figure 8:
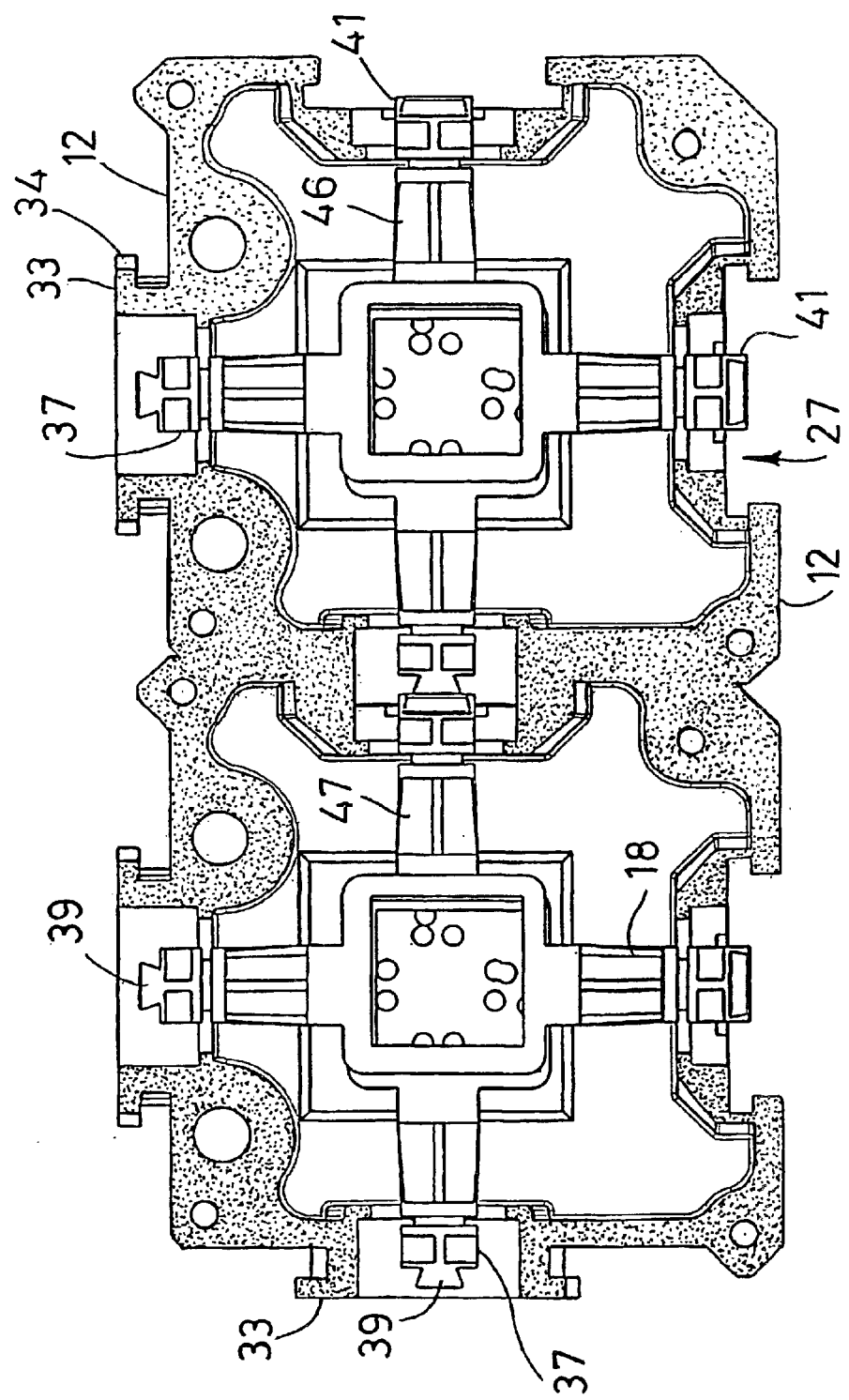
FIG. 8 is a view similar to that of FIG. 6, but with an alternative coupling piece.

For some applications, it may be desirable to cause the two runner bars to move in unison when one bar is moved in one direction, but for that one bar to be independently moveable in the other direction. For this purpose, the groove 43 in coupling piece 41 may be given a simple rectangular cross-sectional shape, rather than the dove-tail shape shown in FIGS. 5A and 5B. Then, on joining together the two interlock units, the connector block 39 will simply locate in that groove 43 but may move axially out of that groove, in use. Such a coupling piece is shown in FIG. 8; the right hand runner bar 46 may move to the right without pulling the left hand runner bar 47. Moreover, runner bar 47 may move to the left without pulling runner bar 46. However, movement of either bar in the opposite sense will push the other runner bar in the same sense.

Another alternative would be wholly to omit the coupling piece 41. In this case, either runner bar may push the other runner bar but there is no other interconnection.

Figure 9:
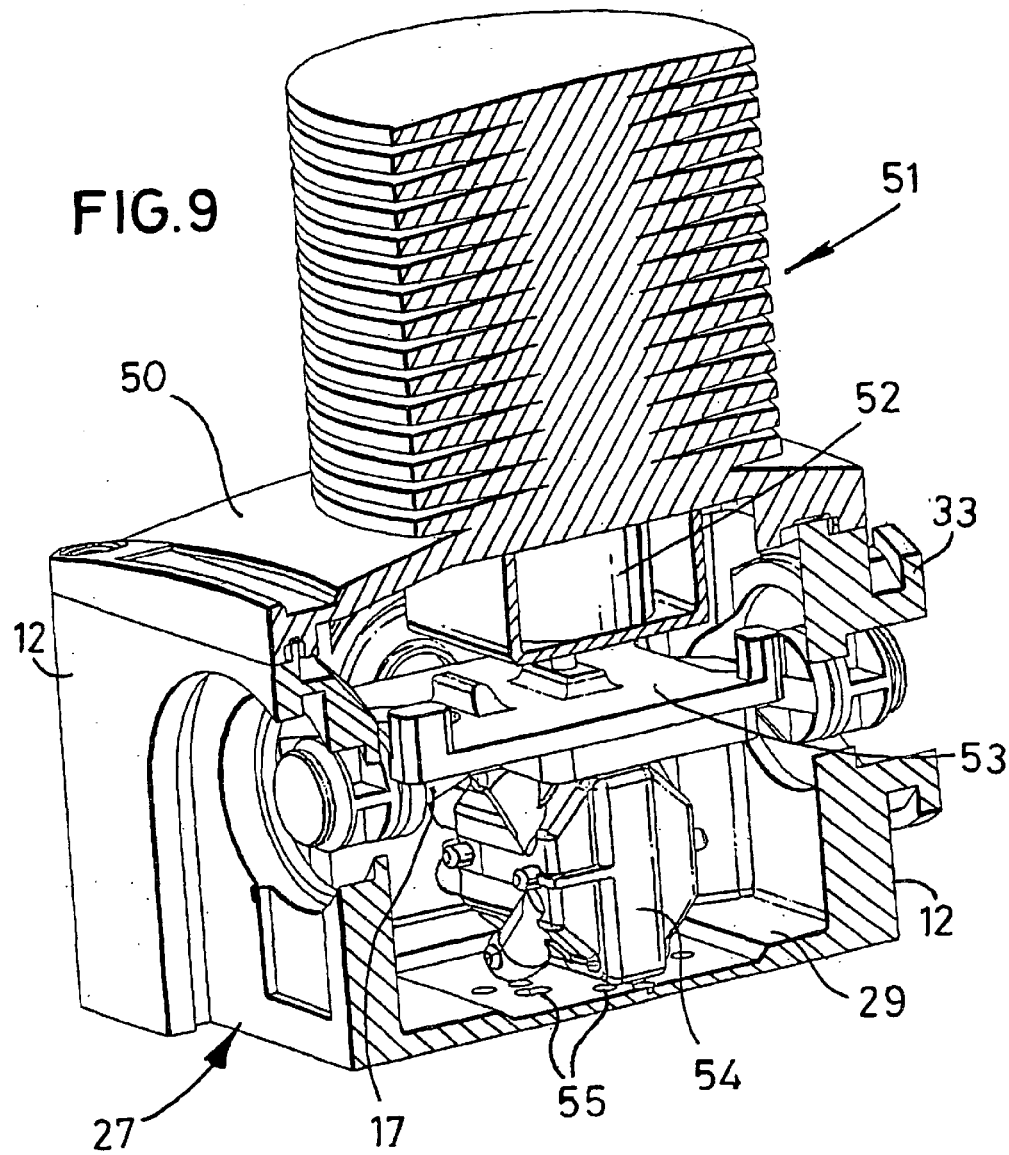
FIG. 9 is a cut-away isometric view of a unit incorporating a solenoid-operated actuator.

FIG. 9 shows an alternative actuator arrangement for a unit, to replace the key-operated actuator shown in the previous Figures. The base part of the unit is the same as that described above, but the unit has a different cover plate 50 carrying a solenoid 51, having an armature 52. The lower end of the armature is connected to a blocking plate 53 arranged above the runner bar 17 extending across the unit. A spring (not shown) biases the blocking plate downwardly but on energisation of the solenoid, the plate is lifted clear of the runner bar. Below the runner bar, a switch 54 is mounted on the bottom plane 29 of the unit 11, the switch picking-up in suitable holes 55 formed through the bottom plane, the switch sensing the position of the runner bar 17.

In this arrangement, the blocking plate 53 serves to control movement of the runner bar either by blocking its movement, or permitting its movement. In turn, this prevents or permits the movement of a runner bar in an adjacent unit of the interlock mechanism, under the action of an actuator (such as a key-operated actuator) of that adjacent unit. In an alternative arrangement, the blocking plate 50 may include camming surfaces which serve to effect movement of the runner bar of that unit. The supply of electrical power to the solenoid may be under the control of a remote switch operated by some other component, such as a moveable machine guard.

Further units (not shown) may be employed in an interlock mechanism and having cover plates differently configured, for other actuators such as a motor driven actuator to operate the runner bar of the unit, or to support a switch sensing the position of the runner bar.

It will be appreciated that though, in the drawings, only two interlock units are shown, in a practical installation many such interlock units may be joined together. More complex interlocking arrangements may be provided by having the interlock units joined in a grid array, apart from a simple linear array as shown.

Figure 10:
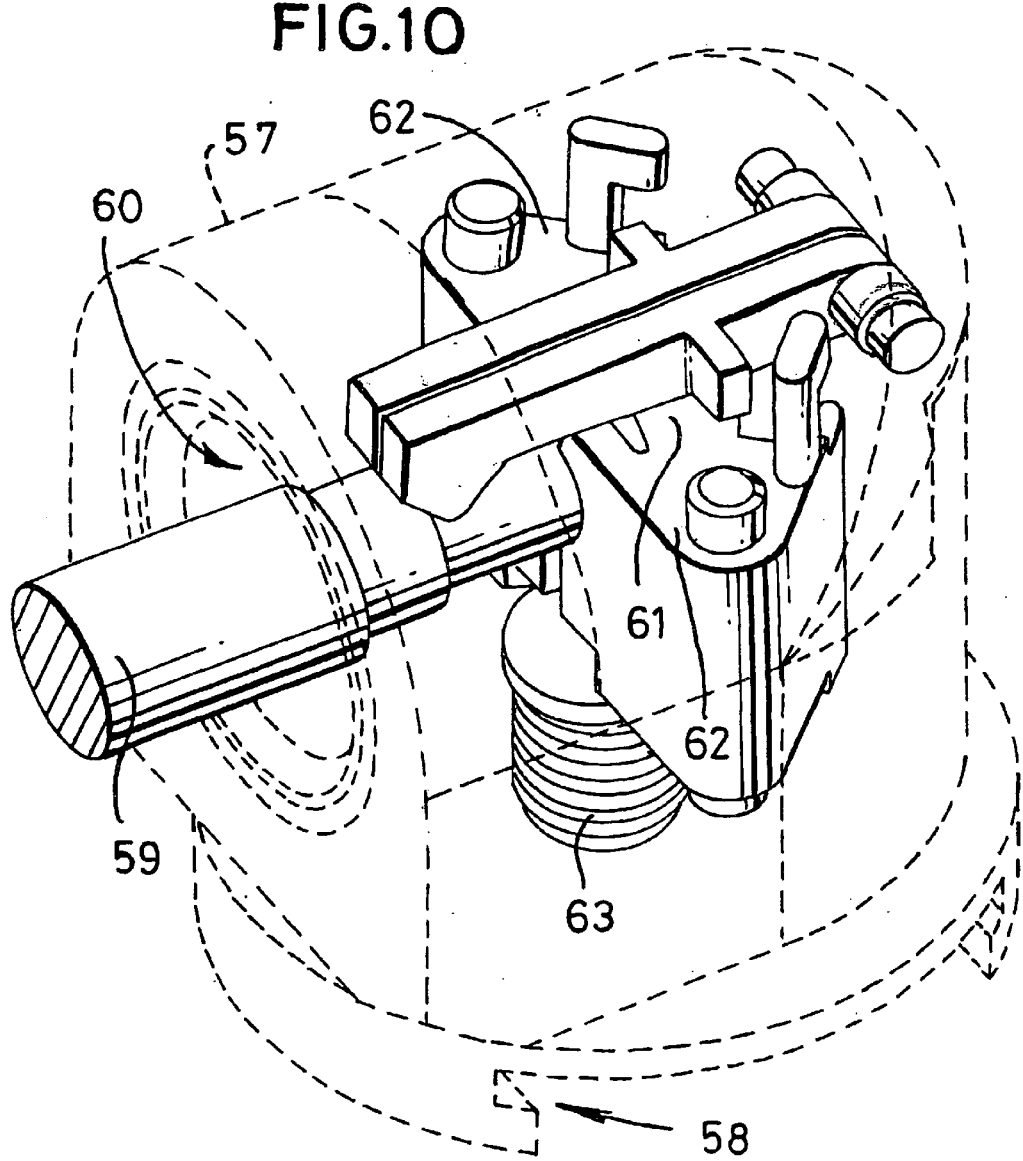
FIG. 10 shows a latch bolt end unit which may be coupled to one of the units of FIG. 1.

FIG. 10 illustrates a latch bolt mechanism for use with the interlock assembly described above, for example to control the opening of a machine guard. A housing 57 is provided with a slot 58 of a similar form to the slot 27 of an interlock unit 10, so as to permit interengagement with a projection 33 of such a unit. A bolt 59, directly connected for example to the machine guard to be protected, enters the housing 57 through an opening 60 and has a conical head 61 formed at its end, with an abutment face behind the head 61. A pair of gates 62 are pivotally mounted within the housing which gates are driven by the head 61 on moving deeper into the housing, to the position shown. A bar 63 is mounted for sliding movement at right angles to the axis of the bolt 59 and is spring-loaded to a position where the gates 62 may open to permit insertion of the bolt 59. The end of the bar 63 engages the end of a runner bar of the interlock unit to which the housing 57 is joined, so that until the appropriate keys have been inserted into their receptors and suitably turned, the bar 63 cannot move to free the gates and so permit the movement of the bolt 59 into the housing 57. In turn, this prevents the machine guard being opened until the required safety procedures have been followed, in shutting down the machine and inhibiting its operation by removal of its keys and trapping the keys in the interlock mechanism.

It will be appreciated that the interlock assembly may be used in many other circumstances besides that described above, for a machine guard. For instance, electrical switches or other mechanical devices may be controlled by the interlock mechanism, as is well known with existing interlock mechanisms.

What is claimed is:

1. An interlock unit for use with at least one other like interlock unit to form an interlock mechanism, which interlock unit has a top face and opposed pairs of side walls, at least one runner bar mounted in the unit for lateral sliding movement when the unit has been linked to another like interlock unit, an actuator for effecting lateral sliding movement of the runner bar which actuator is supported on the top face of the unit, one wall of an opposed pair thereof being provided with one part of a two-part unit connector and the opposed wall with the other part of the connector, which connector is arranged to permit two similar units to be joined together by relative sliding movement of the two units in the plane of the side walls to inter-engage the respective connector parts, the runner bar of one unit being engageable with the runner bar of a connected unit to transfer sliding motion thereto for sliding movement of the runner bar of said one unit in at least one direction.

2. An interlock unit as claimed in claim 1, wherein the actuator includes a receptor for a removable key, whereby insertion of a suitable key and turning the receptor operates the actuator.

3. An interlock unit as claimed in claim 1, wherein the actuator includes a solenoid, whereby the supply of electrical power to the solenoid operates the actuator.

4. An interlock unit as claimed in claim 1, wherein the unit connector allows the joining together of two units by relative sliding movement in a direction normal to the top surfaces of the two units.

5. An interlock unit as claimed in claim 1, wherein the one part of the unit connector defines a projection of a complementary form to the re-entrant slot whereby the slot of one unit and the projection of a second unit are inter-engageable by relative movement of the units, along the length of the slot.

6. An interlock unit as claimed in claim 1, wherein the runner bar is arranged for sliding movement in a direction normal to the opposed pair of side walls carrying the connector parts.

7. An interlock unit as claimed in claim 6, wherein a respective aperture is formed through each of the two connector parts in the opposed side walls and the runner bar is arranged for sliding movement in the apertures.

8. An interlock unit as claimed in claim 1, wherein motion is transferred from one runner bar of one unit to the runner bar of a connected unit by the ends of the respective runner bars abutting one another.

9. An interlock unit as claimed in claim 1, wherein a coupling piece is provided on one end of the runner bar of one unit and is engageable with the opposed end of the runner bar of a connected unit.

10. An interlock unit as claimed in claim 9, wherein the coupling piece permits either runner bar of two connected units to move away from the runner bar of the other unit but transfers the motion of one runner bar to the runner bar of a connected unit for motion towards the other unit.

11. An interlock unit as claimed in claim 9, wherein the coupling piece inter-connects the two runner bars of connected units, for transferring the motion of one runner bar in either direction to the runner bar of a connected unit.

12. An interlock unit as claimed in claim 9, wherein the coupling piece is engageable in a radial direction with the end portion of a runner bar by transverse sliding movement with respect to the bar.

13. An interlock unit as claimed in claim 12, wherein the coupling piece when mounted on the runner bar of one unit is arranged to inter-connect with the runner bar of a second unit as the second unit is joined to the one unit by interengagement of the respective connector parts.

14. An interlock unit as claimed in claim 1, wherein the unit is generally of rectangular shape having two pairs of opposed side walls, each pair of side walls having the two parts of a unit connector whereby a similar unit may be joined to any one of the side walls of the unit.

15. An interlock unit as claimed in claim 14, wherein the unit has a pair of runner bars arranged with their axes mutually at right angles and each arranged to slide normally with respect to the two pairs of side walls.

16. An interlock unit as claimed in claim 2, wherein a cam is rotatably mounted within the unit to effect sliding movement of the or each runner bar of the unit, which cam is rotatably coupled to the key receptor.

17. An interlock mechanism whenever assembled from two or more interlock units as claimed in claim 1.

* * * * *